April 13, 1926.
W. I. TWOMBLY
1,580,179
GAS CONTROL FOR OVEN BURNERS OF GAS STOVES
Filed June 6, 1922
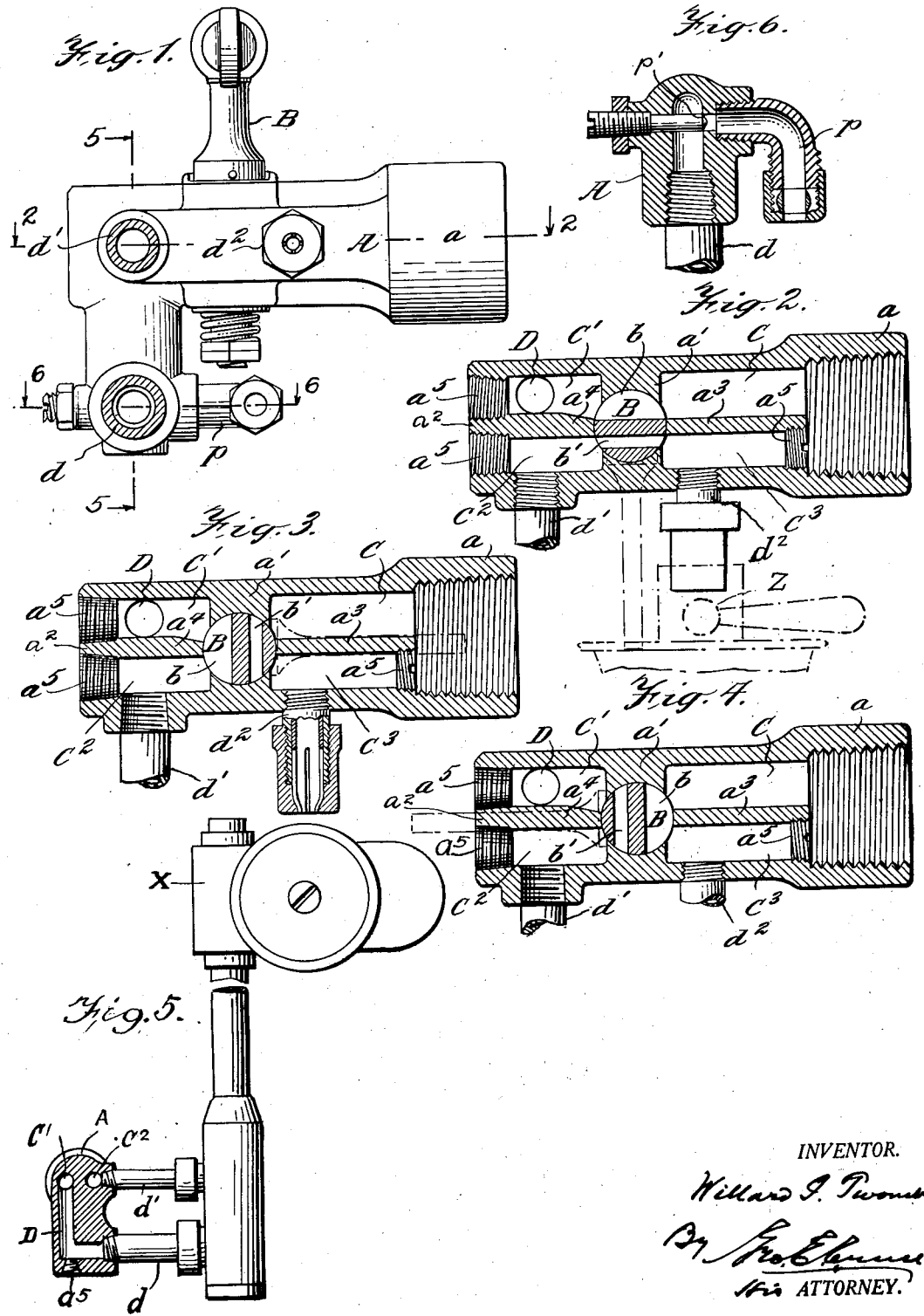
INVENTOR.
Willard I. Twombly
By Geo. E. ———
His ATTORNEY.

Patented Apr. 13, 1926.

1,580,179

UNITED STATES PATENT OFFICE.

WILLARD I. TWOMBLY, OF NEW YORK, N. Y., ASSIGNOR, BY MESNE ASSIGNMENTS, TO THE WILCOLATOR COMPANY, OF NEWARK, NEW JERSEY, A CORPORATION OF DELAWARE.

GAS CONTROL FOR OVEN BURNERS OF GAS STOVES.

Application filed June 6, 1922. Serial No. 566,426.

*To all whom it may concern:*

Be it known that I, WILLARD I. TWOMBLY, a citizen of the United States, residing in the borough of Manhattan, city, county, and State of New York, have invented certain new and useful Improvements in Gas Controls for Oven Burners of Gas Stoves, of which the following is a specification.

This invention relates to control mechanism designed for use in controlling the supply of a fuel to be consumed so that a uniform temperature may be maintained. More specifically the invention is directed to the provision of a control mechanism especially adapted for use in connection with gas stoves to control the flow of gas to the burners therof.

Gas stoves are now commonly provided with thermostatic control devices of different types, which operate to control the flow of gas to the burners in accordance with the temperature in the oven chamber, so that by proper setting of the thermostatic device, an even temperature of any selected value may be maintained in the oven chamber. Sometimes, however, it is desirable to dispense with the action of this thermostatic control, and the present invention involves the provision of mechanism by which the burners may be supplied with gas to produce a predetermined temperature, this mechanism being arranged so that it may be cut off to permit manual control of the gas flow when desired.

The present device may be employed in gas stoves already installed and in use, and it includes a casing which is connected to the usual manifold of the stove and which has an inlet chamber into which gas is admitted from the manifold, and an outlet chamber from which gas flows to the burners. The casing also includes a pair of chambers which are connected together outside the casing, through a thermostatic control device of any suitable form. Within the casing is a valve which is so arranged that it may be placed in one position to cause a flow of gas from the inlet through the thermostatic device to the outlet, while in another position it permits a direct flow of gas from the inlet chamber to the outlet chamber of the casing, while shutting off the chambers serving as inlet and outlet respectively of the thermostatic device, both from each other and from the gas inlet and outlet chambers. In a third position this valve operates to cut off the flow of gas from the inlet to the outlet. The device also includes a passage connected with a line which passes through the thermostatic control mechanism, so that when the latter is in operation gas may be supplied to a pilot light.

In the accompanying drawings there is illustrated one embodiment of the invention which has been found to be satisfactory, and in these drawings, Fig. 1 is a view of the device in elevation, Fig. 2 is a view partly in section, taken on the line 2—2 of Fig. 1, and showing the three-way valve in one position, Figs. 3 and 4 are sectional views taken on the line 2—2 of Fig. 1, showing the three-way valve in different positions of adjustment, Fig. 5 is a vertical view partly in section, showing the connection with the thermostatic control mechanism, and Fig. 6 is a detail sectional view taken on the line 6—6 of Fig. 1.

Similar reference characters designate corresponding parts in all of the Figures.

A designates a casing one end $a$ of which is adapted for connection with a suitable gas supply, as for example the usual manifold of a gas stove. The interior of the casing A is provided with a partition wall $a^1$ extending transversely of the casing in which a valve or cock B works, an end wall $a^2$ and with transverse walls $a^3$, $a^4$, to form chambers or passages C; $C^1$; $C^2$; $C^3$. In practice the casing A is a casting, and after the casting is formed it is tooled to form the chambers $C^1$; $C^2$; $C^3$, after which screw threaded plugs $a^5$ are inserted to close the openings. The chamber $C^1$ communicates with a passage D formed in the casing A, and this passage D is connected by a pipe $d$ with the inlet opening of a thermostatic control of any desired type, generally designated X, such for example as that disclosed in my application for patent filed May 1, 1922, Serial No. 557,669. The chamber $C^2$ is connected by a pipe $d^1$ with the outlet opening of the thermostatic control X. The chamber $C^3$ is connected by a pipe or other connection $d^2$ with the burner or burners of an oven.

The valve or cock B is provided with a cut-away portion $b$ and with a passage $b^1$, and as will be noted from Figs. 2, 3 and 4, it has three positions. In Fig. 2 the cock is in such position that the chambers C and $C^1$ are in communication as are the chambers $C^2$ and $C^3$. In this position of the valve or cock B gas flows from the supply manifold of the gas stove into the chamber C, through the valve (cut-away portion $b$) into the chamber $C^1$. From there it passes through the passage D, pipe $d$ into the inlet opening of the thermostatic control, through the oulet of the thermostatic control, through pipe $d^1$ into the chamber $C^2$. From there is passes through the passage $b^1$ into chamber $C^3$ and from there through the connection $d^2$ to the burner or burners generally designated Z. In Fig. 3 the valve or cock B is in such position that the supply of gas is cut off from the chambers $C^1$, $C^2$ and $C^3$, and consequently no gas is supplied to the burners. In Fig. 4 the valve or cock B is in such position that gas from the chamber C flows directly to the chamber $C^3$ and hence to the oven burner. In this position of the valve or cock B the thermostatic control is entirely cut off from the gas supply.

Referring to Fig. 6, when the valve or cock B is set in the position shown in Fig. 2, a pilot light for the oven burner is supplied through the connection $p$, the gas passing through said connection from the passage D. The amount of gas flowing is controlled by the needle valve $p^1$.

Having thus described my invention, what I claim as new is:

1. A control mechanism which comprises the combination of a casing having a chamber provided with a gas inlet adapted to be connected to a gas supply, a second chamber in the casing having a gas outlet adapted to be connected to a gas burner, a pair of chambers in the casing connected together through a connection outside the casing, and a valve within the casing movable to different positions of adjustment, the said valve being operative in one position to connect the inlet chamber to one of the pair of chambers, and the outlet chamber to the other, in a second position operative to connect the inlet and outlet chambers together, while shutting off the pair of chambers therefrom and from each other, and in a third position operative to shut off the inlet and outlet chambers from each other.

2. A control mechanism which comprises the combination of a casing having an inlet chamber adapted to be connected to a gas supply, an outlet chamber adapted to be connected to a gas burner, and a pair of chambers connected through a thermostatic control mechanism, and a valve in the casing having a passage formed through it and having a portion cut away, this valve being movable to different positions of adjustment and operable in one position to connect the inlet chamber and one of the pair of chambers through the cut-away portion, and the outlet chamber and the second of the pair of chambels through the passage, in a second position operable to connect the inlet and outlet chambers directly through the cut-away portion while closing the pair of chambers from the inlet and outlet chambers and from each other, and in a third position operable to connect the pair of chambers through the cut-away portion while shutting off the inlet and outlet chambers from each other and from the pair of chambers.

3. A control mechanism which comprises the combination of a casing having an inlet chamber adapted to be connected to a gas supply, an outlet chamber adapted to be connected to a gas burner, and a pair of chambers connected through a thermostatic control mechanism, a passage adapted to be connected to a pilot light in the line leading through the thermostatic control mechanism, and a valve in the casing movable to different positions of adjustment and in one position operative to connect the inlet chambers to one of the pair of chambers and the outlet chamber to the other, in a second position operative to connect the inlet and outlet chambers directly while shutting off the pair of chambers therefrom and from each other, and in a third position operative to shut off the inlet and outlet chambers from each other and from the pair of chambers while connecting the pair of chambers.

WILLARD I. TWOMBLY.